United States Patent [19]
Schlickhoff

[11] Patent Number: 5,605,189
[45] Date of Patent: Feb. 25, 1997

[54] METHOD FOR CONTROLLING THE TEMPERATURE OF AN INTERMITTENTLY STANDING AND FLOWING FLUID WHICH IS AT REST DURING STANDSTILL INTERVALS AND IS FLOWING DURING FLOW INTERVALS

[75] Inventor: Reiner Schlickhoff, Westphalia, Germany

[73] Assignee: Imation Corp., St. Paul, Minn.

[21] Appl. No.: 393,340

[22] Filed: Feb. 23, 1995

[51] Int. Cl.$^6$ .................................................. F25B 13/00
[52] U.S. Cl. .............................. 165/263; 34/493; 34/446
[58] Field of Search ...................... 165/2, 30; 236/78 D; 34/493, 495, 446; 62/3.3, 3.7

[56] References Cited

U.S. PATENT DOCUMENTS

| | | | |
|---|---|---|---|
| 4,548,259 | 10/1985 | Tezuka et al. | 165/30 |
| 4,620,421 | 11/1986 | Brown et al. | 236/78 D |
| 4,989,626 | 2/1991 | Takagi et al. | 62/3.7 |
| 5,027,145 | 6/1991 | Samuels . | |
| 5,160,399 | 11/1992 | Ueda et al. | 34/446 |
| 5,404,656 | 4/1995 | Matsuda et al. | 34/493 |
| 5,409,547 | 4/1995 | Watanabe et al. | 62/3.7 |
| 5,421,097 | 6/1995 | Yamamoto et al. | 34/446 |
| 5,456,081 | 10/1995 | Chrysler et al. | 62/3.7 |

FOREIGN PATENT DOCUMENTS

| | | |
|---|---|---|
| 0417782A3 | 3/1991 | European Pat. Off. . |
| 0449550A3 | 10/1991 | European Pat. Off. . |
| 3742269C1 | 1/1989 | Germany . |
| 4036210A1 | 5/1992 | Germany . |
| 4230208A1 | 3/1993 | Germany . |
| 4237810A1 | 5/1993 | Germany . |
| 2263559 | 7/1993 | United Kingdom . |

*Primary Examiner*—Edward K. Look
*Assistant Examiner*—Mark Sgantzos
*Attorney, Agent, or Firm*—Mark A. Litman; William K. Weimer

[57] ABSTRACT

In the method for controlling the temperature of an intermittently standing and flowing fluid which is at rest during standstill intervals and is flowing during flow intervals, a desired temperature for the fluid is predetermined and the actual temperature of the fluid is measured. The fluid is heated and/or cooled by a tempering device, depending on whether the actual temperature is higher or lower than the desired temperature. The tempering device is controlled by a control unit with at least one variable and self-adjusting control parameter. In the method, it is detected whether the fluid is presently at a standstill or in flow. The value of the control parameter of the control unit valid at the end of a flow interval is stored and at the beginning of the next flow interval is set as the current control parameter in the control unit.

11 Claims, 6 Drawing Sheets

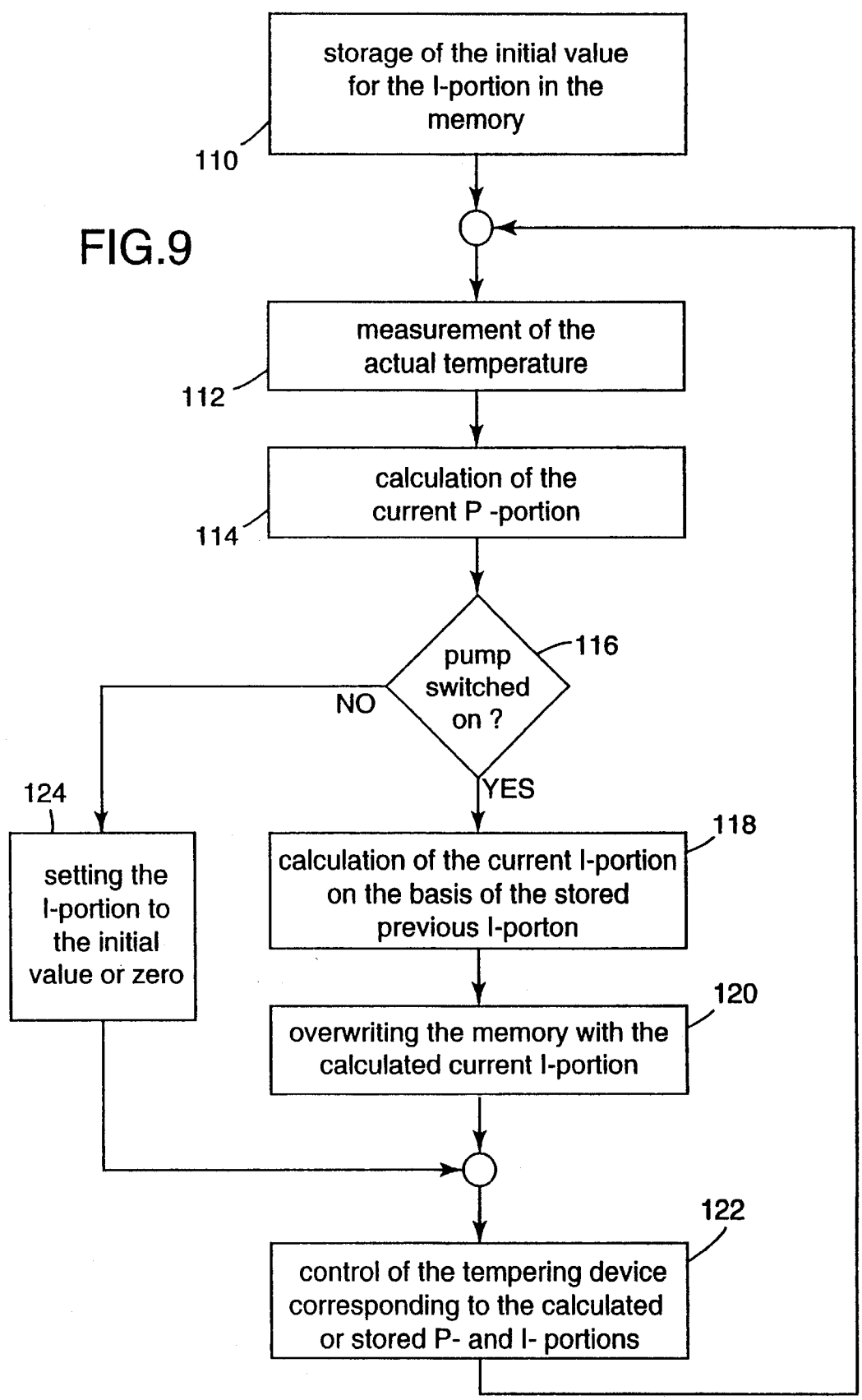

METHOD FOR CONTROLLING THE TEMPERATURE OF AN INTERMITTENTLY STANDING AND FLOWING FLUID WHICH IS AT REST DURING STANDSTILL INTERVALS AND IS FLOWING DURING FLOW INTERVALS

BACKGROUND OF THE INVENTION

1. Field of the Invention

The invention is directed to a method for controlling the temperature of an intermittently standing and flowing fluid (a gaseous and/or liquid medium) which is at rest during standstill intervals and is flowing during flow intervals.

2. Background of the Art

The developer apparatus of a color proofing system is exemplary of the need to maintain an intermittently supplied fluid at a specific desired temperature during flow intervals. In such a device, the coated fluid is developed by wetting it with developer liquid. For this purpose, the proof is moved along a developer liquid dispenser unit.

Known developer apparatus for color proofing systems are provided with a tempering device for tempering the developer liquid, i.e., for controlling the temperature of the developer liquid. For obtaining proofs of high quality, it is usually required that the developer liquid supplied to the developer liquid dispenser unit has a temperature within a predetermined range of temperatures (generally 23° C.–26° C.). For obtaining multi-colored proofs, the above-described developing process is performed for each of the primary colors of the proof. Usually, multicolored proofs are composed of the three colors a) red, blue and yellow or b) cyan, magenta, and yellow, and black in addition. Thus, the development of such a proof is carried out in four developing processes, which are interrupted by the laminating of the corresponding color particles and the exposure of the proofs provided with the color particles. This means that, when generating a multi-color proof, only phase-wise use is made of the developer apparatus each time. For the quality of the multicolored proof, it is important that the developer liquid is kept at nearly an identical temperature during all development processes for a proof. In this regard, the absolute value of the temperature of the developer liquid is less important as long as the temperature is in the above-defined range. Known developer apparatus are equipped with a temperature sensor or the like for detecting the temperature of the developer liquid. A control unit connected to the temperature sensor will then control the tempering device correspondingly for maintaining the developer liquid at a substantially constant temperature.

A problem of temperature control resides in that the temperature of the developer liquid need be exact only during the time periods when the proof passes through the developer apparatus. In known developer apparatus, to safeguard this exactness, the complete supply quantity of the developer liquid is kept at the (optimum) operating temperature. This is economically disadvantageous because, as the case may be, there have to be tempered large quantities of developer liquid which nonetheless will not be used for the developing process.

In view of the above problem, an advantage is obtained by tempering only that quantity of developer liquid which is currently supplied. Such continuous-flow tempering devices are known (DE 33 40 667 A1, DE 40 36 210 A1, WO 89/05129, DE 41 09 677 A1, EP 0 338 283 A1). Considering that a developer apparatus for developing an exposed proof (DIN-A3) requires about 140 ml of a developer liquid to be supplied in about one minute and that this developer liquid has to be kept exactly on the desired temperature, it is evident that the demands posed on the accuracy of the operation of the temperature control are rather high. In particular, control deviations in the form of differences between the desired temperature and the actual temperature cannot be tolerated. Thus, the used control should include an integral portion which is responsible for the stationary accuracy. However, also a proportional portion should be provided which handles the dynamics (jump-like changes at the input of the control or disturbing factors). Because of the two completely different operating modes, "developer liquid flowing" and "developer liquid standing," temperature control in a continuous-flow tempering device is still not without difficulties.

Temperature control systems designed for flowing fluids which operate with integral, proportional and/or differential portions which can be switched in dependence from the respective operating mode, are known, e.g., from EP-A-0 303 833, U.S. Pat. No. 4,991,770 and EP-A-0 454 132. Further temperature control systems are disclosed in U.S. Pat. No. 4,055,296, U.S. Pat. No. 3,834,617 and EP-A-0 298 415. None of these control systems can be used in developer apparatus for color proofing systems because the temperature control is not performed with sufficient accuracy.

SUMMARY OF THE INVENTION

It is one aspect of the invention to provide a method for controlling the temperature of an intermittently standing and flowing fluid being at rest during standstill intervals and being in flow during flow intervals, which reliably performs a high-precision temperature control of the fluid in the flow intervals and which can be easily realized with respect to its circuitry and construction.

BRIEF DESCRIPTION OF THE DRAWINGS

FIG. 9 is a flow diagram for explaining the temperature control method.

DETAILED DESCRIPTION OF THE INVENTION

Figure 1:
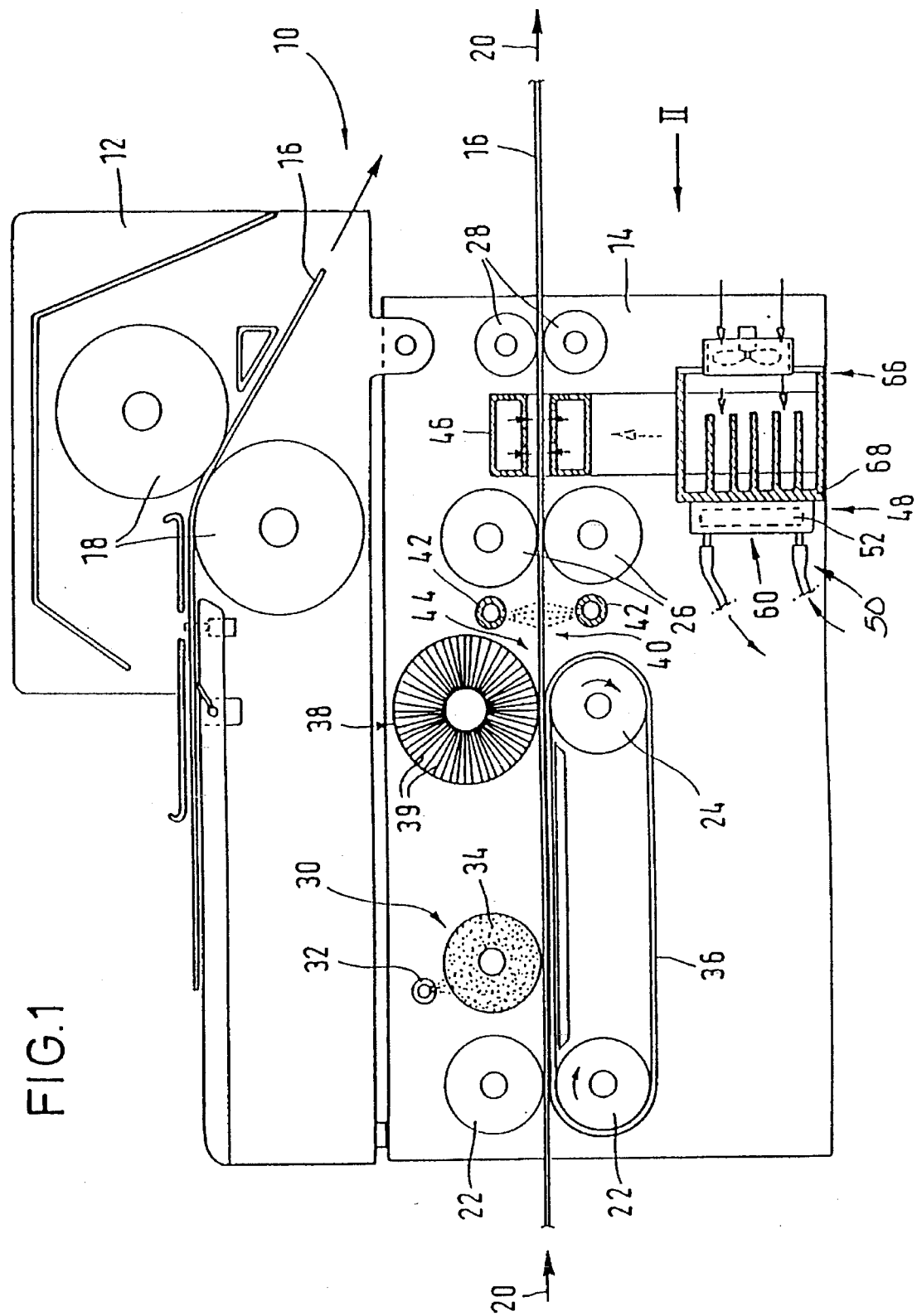
FIG. 1 is a side view of the basic internal construction of a combined unit consisting of a laminator unit and a developer apparatus for color proofing systems.

According to the invention, a method for temperature control is described wherein a desired temperature for the fluid is predetermined, the actual temperature is measured, the fluid is heated and/or cooled by a tempering device, depending on whether the actual temperature is higher or lower than the desired temperature, the tempering device is controlled by a control unit with at least one variable and self-adjusting control parameter, it is detected whether the fluid is presently at a standstill or in flow, and the value of the control parameter of the control unit valid at the end of a flow interval is stored and at the beginning of the next flow interval is set as the current control parameter in the control unit.

In the method according to the invention, there is used a control unit with at least one variable, self-adjusting control parameter. During the flow intervals, this at least one control parameter is continuously updated, which is performed, for instance, on the basis of the control deviation, i.e., the difference between the actual temperature and the desired temperature with respect to the differential temperature amount and the preceding sign (positive or negative deviation). Control units with variable, self-adjusting control parameters will adjust—possibly with a time delay—to the actual conditions of the system to be controlled. For computing the self-adjusting control parameters, a large number of control systems are available to the expert.

In the method of the invention, the at least one control parameter of the control unit changes after lapse of specific intervals (scanning intervals) which are predetermined by the control unit itself. The at least one control parameter has different values for the two operating modes of the controlled system, i.e., for the modes "fluid flowing" and "fluid standing." Especially in the flow intervals, it is to be guaranteed that the actual temperature is equal to the desired temperature, i.e., the actual temperature is changed to or maintained at the desired temperature. In the method of the invention, the at least one adjustable control parameter of the control unit is adjusted, at the beginning of the flow interval, to the value of this control parameter at the end of the previous flow interval. Thus, in the method of the invention, a change of the control parameter within the standstill interval between two flow intervals is ignored in as far as the control parameter changing within this standstill interval is not taken over at the beginning of the flow interval following the standstill interval. Therefore, at the beginning of a flow interval, the at least one adjustable control parameter of the control unit has already a value which comes relatively close to the optimum value since it has been taken over from the last operating mode "fluid flowing." In this case, this takenover preset value for the at least one adjustable control parameter is more useful than the actual value of the control parameter at the end of the standstill interval preceding the flow interval. In other words, the at least one control parameter is selectively handed down according to the operating mode of the system. This offers the advantage that the at least one variable, self-adjusting control parameter need not be newly formed at the beginning of each operating mode "fluid flowing," which would consume some length of time and could still lead to considerable control deviations.

Particularly in the above-described developer apparatus of color proofing systems, such deviations of the actual temperature from the desired temperature cannot be tolerated because the temperature must remain identical for all of the four or more developer processes for a proof. Further, if the formation of the at least one variable, self-adjusting control parameter is always started newly, this entails the risk that the "optimum value" for this control parameter is not reached by the end of the flow interval due to the shortness of the interval. When, however, the formation of the parameter starts already from a relatively "good" value for the control parameter at the beginning of the flow interval, it can be expected that the "optimum value" is reached quickly, i.e., after a few seconds and, in any case, long before the end of the flow interval.

The method of the invention can be implemented in a comparatively simple manner, and the circuity and the constructional details for implementing the method can be easily realized. Self-adjusting control units, as such, are known in the state of the art. The takeover of the value of the control parameter which has been valid at the end of a previous flow interval for the start of the next flow interval can be performed in a quite simple manner in that the updating of this control parameter is omitted in the standstill intervals, i.e, during the standstill interval, there is carried out no overwriting of the stored value for the control parameter. The two operating modes "fluid flowing" and "fluid standing" can be easily distinguished by a flow velocity measuring device or by detecting the on- and off-condition of a conveyer pump. The method of the invention provides a temperature control for intermittently flowing fluids which is relatively accurate and is economical, as tempering is performed only on the quantity of fluid which is in flow, so that no energy is wasted for tempering the supply quantity of fluid.

A preferred embodiment of the invention provides that, in addition to the actual temperature, also the flow temperature is measured and that, at the end of the flow interval, the current value of the control parameter is stored as assigned to the actual flow velocity. At the beginning of the next flow interval, the initial value is selected to be that one of the stored control parameter values which corresponds to the flow velocity of the fluid in this flow interval. The technical background of this embodiment of the invention is seen in the fact that, e.g., in the developer apparatus of a color proofing system, the quantity of developer liquid to be supplied per time unit within a flow interval will differ in dependence on the size of the proof. Thus, if different conveying rates, i.e., different flow velocities, are admitted, it is suitable to preset the initial value for the control parameter in dependence on the flow velocity. This allows for optimum presetting of the control parameter under the secondary condition "flow velocity."

Generally, within the standstill intervals, the method of the invention works both in the still active condition of its control unit and in the deactivated condition thereof. Suitably, however, the quantity of fluid in the tempering device should be kept on the desired temperature also in the standstill intervals.

Preferably, the control unit performs at least one integral control process; thus, the at least one variable and self-adjusting control parameter can be the I-portion of the integral control. The I-portion provides for the stationary exactness of the control unit. The I-portion is inaccurate especially in the case of jump-like changes at the input of the control unit if it has previously been preset for a stationary transient condition such as in standstill intervals. Thus, the inventive method, providing the takeover of at least one self-adjusting control parameter at the beginning of a flow interval, is suitably used for the I-portion of an integral control.

Besides the integral control, the temperature control system of the invention also performs a proportional control. Also in this case, it is of advantage if also the P-portion representing the proportional control is variable and self-adjusting. The value of the P-portion valid at the end of a flow interval does not necessarily have to be taken over as an initial value at the beginning of the next flow interval. Temperature control is sufficiently accurate also if, at the beginning of a standstill interval, operation is continued with that value of the P-portion which had been valid at the end of the standstill interval.

Preferably, the one variable and self-adjusting control parameter is set in dependence on the current control deviation, i.e., the current difference between the actual temperature and the desired temperature (amount and sign). The actual amount of the control parameter is determined according to the respective control method applied.

Preferably, the fluid is heated by at least one electrical heater element and/or is cooled by at least one cooling unit such as a Peltier element. The amounts of the electric supply voltages of both elements are set under control of the control unit. The Peltier element is a heat pump which is operated exclusively electrically, which has the advantage that no cooling fluids of the like need be used for cooling the fluids. The cooling capacity of a Peltier element can be varied in a simple manner by adjustment of the supply voltage.

Preferably, also the heater element is a Peltier element which is fed by a supply voltage of opposite polarity to that of the supply voltage of the Peltier element used for cooling. A further variant is provided for the case that the electric supply voltage of at least one Peltier element provided for tempering the fluid can be reversed in polarity so that the Peltier element serves for heating or for cooling, as desired. Peltier elements respond quickly and directly to the application of the electric supply voltage so that the required heating or cooling will start immediately, which is a basic precondition for temperature control of flowing fluids.

Peltier elements are primarily used for cooling (EP 0 338 283 A1). Using the hot side of a Peltier element to heat an effective medium (i.e., the developer liquid in the instant case), is a less widespread approach (DE 40 36 210 A1, DE 33 40 667 A1, DE 93 05 160 U1). It is particularly advantageous to use a Peltier element for the tempering of flowing liquids or other media which have an initial temperature above or below their operating temperature and therefore can and must be cooled or heated, respectively. If these purposes are fulfilled by only one aggregate, i.e., the Peltier element—which, by reversing the polarity of the supply D.C. voltage, can be used both for cooling and for heating—the technical and constructional complexity is considerably reduced.

Peltier elements make use of the so-called Peltier effect, a reversal of the Seebeck effect in thermocouple elements. Two materials having different Seebeck coefficients (normally, semiconductor materials are used), when subjected to a D.C. voltage (low voltage), will heat up or cool down at their connecting regions or cool down or heat up at their mutually averted ends. Thus, Peltier elements comprise materials arranged in pairs and having different Seebeck coefficients, said materials being arranged behind each other spatially and electrically. The respective regions connecting the materials of such a pair of materials, comprising materials having good thermal or electric conductivity, form one tempering face of a Peltier element, while the regions connecting the materials of adjacent pairs of materials likewise have good thermal and electric conductivity and form the other tempering face of the Peltier element. According to the first variant of the invention explained here, there is used respectively at least one of these tempering faces for temperature control of the developer liquid, and this tempering face is either heated or cooled by changing the polarity of the supply voltage.

Some characteristics and advantages of using Peltier elements for the tempering of developer liquid of a developer apparatus of a color proofing system will be explained hereunder as illustrative of the temperature control of intermittently standing and flowing fluids. The control method of the invention is also suitable for other applications in the treatment of imaging and imageable materials such as photographic originals (proofs, photographic films, metal and plastic printing plates) such as, e.g., for fixing the originals. Usually, a developer apparatus for developing an exposed proof is provided with a transport means for transporting the proof along a transport path, a developer liquid dispenser unit for supplying developer liquid to the proof, a take-off device for clearing the proof of the colorant (e.g., pigment particles) detached by the developer liquid (or, put in more general terms, for clearing the proof of the visible light-absorbing composition), and a tempering device for the developer liquid to be supplied to the developer liquid dispenser unit through a conduit. The at least one Peltier element of the tempering device is connectable to a supply voltage which can be changed in polarity, wherein, depending on the polarity of the supply voltage, the first tempering face can be heated and the second tempering face can be cooled, or the first tempering face can be cooled and the second tempering face can be heated. At least the first tempering face of the Peltier element can be thermally contacted with the developer liquid to be supplied to the developer liquid dispenser unit.

A developer apparatus for color proofing systems which utilizes Peltier technology can be placed at any desired location since it is not dependant anymore on immobile connections for coolant circuits (supply and discharge of coolant—particularly water). Further, Peltier technology, in terms of construction and manufacture, presents a simple and room-saving solution for a self-sufficient heat pump wherein, e.g., in contrast to heat pumps operating according to the compressor or absorber principle, no complex constructional elements (compressor motor, absorber, circulating pumps, decompressors) are required.

Tempering of the developer liquid is carried out with high accuracy since tempering need be performed only on that quantity of liquid which is used for the current developing process. Thus, it is not the whole quantity of developer liquid contained in a (supply) reservoir or the like, but always only the Currently required quantity that is tempered, i.e., is heated or cooled, as desired, for keeping it on the operating temperature. Thus, the tempering apparatus has a low energy demand and can be given a small size which in turn allows for a more compact overall structure of the developer apparatus. This advantage is further enhanced by the fact that the invention can do without any coolant cycle with connecting means on the developer apparatus for supply and discharge of the coolant. This will also save energy. The use of a Peltier element for heating purposes allows not only for compact dimensions of the heater device but offers the additional advantage that the "cold" which during heating is emanated from the cold side, causes a local cooling of the developer apparatus. Especially in the case of a compact arrangement of the individual elements of the apparatus, this is favorable for the prevention of excessive heat build-up of the apparatus during operation. All of the above aspects together make it possible to provide a small-sized developer apparatus for color proofing systems which represents a stand-alone solution and has a reliably accurate temperature. Therefore, color proofing systems provided with developer apparatus wherein the temperature is controlled according to the invention will be of use also in smaller graphic-reproduction and printing businesses.

According to a variant of the developer apparatus, the developer apparatus includes—among other elements—a transport means for transporting the proof along a transport path, a developer liquid dispenser unit for supplying developer liquid to the proof, a take-off device for clearing the proof of the color particles detached by the developer liquid (e.g., pigment, dye, binder, etc.), and a tempering device for the developer liquid to be supplied to the developer liquid dispenser unit through a conduit. At least one Peltier element is used herein for cooling the developer liquid. If required, a plurality of Peltier elements can be used for cooling. Heating of the developer liquid is performed by a normal electric heating element. Preferably, at least two Peltier elements are used, one of them provided exclusively for the heating function and the other one provided exclusively for the cooling function. As a matter of course, it is also possible to use a plurality of Peltier elements for heating and a plurality of Peltier elements for cooling. In this case, it is not required to reverse the polarity of the supply D.C. voltages for the Peltier element(s) because either of the Peltier elements is activated without the need to change their function as a heating or cooling element. The constructional and functional advantages obtained by this variant (compactness of the apparatus with low energy consumption and low heat-up during normal operating conditions) are the same as those described in connection with the first variant.

Finally, instead of reversing the polarity of the supply D.C. voltage of a Peltier element, it is also possible to cause the to-be-tempered developer liquid to flow along the one or the other tempering face in dependence on its initial temperature and the desired temperature. Thus, in this variant of the developer apparatus, it is provided—among other features—that the tempering device comprises at least one Peltier element provided with a heatable and a coolable tempering face, that both tempering faces of the Peltier element can be contacted with developer liquid, and that the conduit for the developer liquid includes a deflecting means for selectively having the developer liquid—or at least part of it—flowing along the one or the other tempering face. The conduit for the developer liquid includes a branch conduit such that the two bifurcated conduits are guided along both tempering faces of the Peltier element, i.e., along both sides thereof. The deflecting means operated by the inventive control method directs the flow either along the one or along the other of the tempering faces; it is also possible to provide a deflection in such a manner that two partial flows are generated. It is also possible to rotate a Peltier element so that either the cooling or heating face is in contact with the flow.

Preferably, one tempering face of the Peltier element can be thermally contacted with the developer liquid to be tempered, while the other tempering face can be thermally contacted with a heat/cold discharge device. Depending on the operation of the Peltier element, the heating of the developer liquid requires an accompanying discharge of cold from the second tempering face which is not contacted with the developer liquid, while the cooling of the developer liquid requires an accompanying discharge of heat from the tempering face which is not contacted with the developer liquid. This is suitably accomplished by the Peltier element having one of its surfaces abutting on a heat/cold discharge body. The discharge of thermal energy can be enhanced by exposing the heat/cold discharge body to the air stream of a blower.

For preventing the respective tempering face of the Peltier element used for tempering the developer liquid from being wetted by developer liquid, a heat/cold transmission member (in its most simple version provided as a plate having good thermal conductivity) is suitably arranged between the Peltier element and the developer liquid. This heat/cold transmission member is in thermal contact with the respective tempering face of the Peltier element. Preferably, the heat/cold transmission member forms part of the inner surface of the conduit through which the developer liquid flows to the developer liquid dispenser unit.

Preferably, the conduit for the developer liquid in the region of the heat/cold transmission member has an S-shaped configuration or comprises a plurality of parallel channels for forming a comparatively long conduit path along which the developer liquid is in thermal contact with the heat/cold transmission member.

For forming a closed control loop operating according to the method of the invention, a temperature sensor is provided for measuring the actual temperature of the developer liquid downstream of the Peltier element(s) when viewed in the flow direction. Additionally, the initial temperature, i.e., the temperature of the developer liquid upstream of the tempering device, is measured by an additional temperature sensor which is arranged upstream of the tempering device. According to the output signal(s) of the temperature sensor(s), the control unit controls the voltage generating device for the Peltier elements in such a manner that those respective tempering faces of the Peltier element(s) which are used for tempering purposes are brought to the temperature required for reaching the desired temperature. In the above-described first variant, the control unit determines not only the amount but also the polarity of the supply voltage for the Peltier element. In the above-described second variant, there is driven either the Peltier element provided for heating or the Peltier element provided for cooling in dependence on the actual temperature value of the developer liquid and its deviation from the desired value.

For improving the effectiveness of a Peltier element, it is further desired that the dissipation of thermal energy (heat or cold) from that face which is not in thermal contact with the developer liquid is performed as fast as possible. For this reason, it is advantageous to arrange the Peltier element in that region of a heat/cold dissipation body in which the temperature profile of the heat/cold dissipation body has a relative extreme value, in particular the absolute extreme value. If a plurality of Peltier elements are used, the first Peltier element in the flow direction should be located in the above-defined region of the dissipation body. Thus, for instance, in the case of a heat/cold dissipation body having an elongate profile, the first Peltier element in the flow direction is to be located in the middle of the longitudinal dimension of the dissipation body; if, e.g., two additional Peltier elements are used, these should be arranged substantially in the center of the two halves of the dissipation body.

Preferably, the thermal energy which, through energy loss, is dissipated by the tempering device and particularly by the heat/cold dissipation device, is to be returned into the developing process. One possibility consists in using this thermal energy for drying the proof. Namely, developer apparatus of the type discussed here are usually provided with a washing unit in which water is sprayed onto the exposed proof for washing off partially solved color particles and developer liquid. The proof wetted with developer liquid and water must be dried before leaving the apparatus. This is suitably accomplished in the transport path of the proof within the developer apparatus by guiding the proof transversely through a channel having hot air flowing therethrough. This hot air flow may be generated by at least one blower. The air removed by the blower preferably passes along the heat/cold dissipation device (heat/cold dissipation body) or along other units of the tempering device which dissipate thermal energy through energy loss. This is advantageous particularly during the cooling phases of the tempering device because the Peltier element will then transmit heat to the heat/cold dissipation device. If the heat/cold dissipation device itself is provided with blowers, the air flow generated by these blowers is suitably guided directly to the air-intake side of the blowers of the drying means.

Basically, the above-described embodiment can be contemplated regardless of what specific type of unit is chosen for tempering the developer liquid. Preferably, however, the above-described recycling of thermal loss energy of the tempering device is used in connection with Peltier elements for tempering the developer liquid.

As to the configuration of the tempering device in which the developer liquid is heated and/or cooled, many different embodiments are possible. All of these embodiments require that the developer liquid flows along surfaces and/or flows through elements consisting of a material of good thermal conductivity. Thus, for instance, it can be provided that the developer liquid flows through a flat block of thermally conductive material having passage bores formed therein. Large side faces on this flat block may have the Peltier elements arranged thereon. The number of the Peltier elements mounted on the block depends on the demands posed on the tempering of the developer liquid, and on the flow quantities of developer liquid per time unit. Under all these marginal conditions defined by the technology of the developer apparatus itself, it must be safeguarded that the supplied developer liquid has a substantially constant, uniform temperature within the optimum range of temperatures.

With reference to the temperature control of the developer liquid in a developer apparatus of a color proofing system, an embodiment of the invention will be described hereunder in greater detail with reference to the drawings.

FIG. 1 is a schematic view of the internal construction of a combined apparatus 10 for color proofing systems. Apparatus 10 comprises a laminator unit 12 and a developer apparatus 14. In the laminator unit 12, a sheet (not shown) provided with color particles (not shown) is laminated onto a proof 16. For this purpose, the proof 16 is moved through laminator unit 12 by means of two pressure rollers 18. After proof 16 has left laminator unit 12, the carrier sheet (not shown) is withdrawn so that a layer of color particles will remain on the proof. The thus treated proof is then exposed in an exposure station (not shown) and subsequently is developed in a developer apparatus 14.

A transport means is provided for transporting the proof 16 through developer apparatus 14 along the transport path indicated by the arrows 20. Said transport means may comprise a plurality of pairs of driven transport rollers 22, 24, 26, 28 by which the proof 16 is moved. when viewed in transport direction (cf. arrows 20 in FIG. 1), the pair of intake rollers 22 has a developer liquid dispenser unit 30 arranged therebehind, comprising a spray tube 32 adapted for discharging developer liquid through its wall. Spray tube 32 is arranged above a foam roll 34 which is in contact with proof 16 and, during rotation, applies the developer liquid issuing from spray tube 32 onto proof 16. The transport rollers 24 are arranged behind the dispenser unit 30. Further, the transport means includes an endless transport belt 36 which is guided around the roller of the pairs of rollers 22 and the transport roller 24 arranged below the transport path or the proof 16, respectively. The upper strand of transport belt 36 is moved in transport direction (see arrow 20).

Behind the transport rollers 24, there is arranged a rotating brush roller 38 with its bristles 39 sweeping along on the proof. Brush roller 38 serves for detachment and removal of color particles which have been partially dissolved or dispersed by the developer liquid. In addition to brush roller 38, a washing device 40 is provided for removal of the partially dissolved color particles. Washing device 40 comprises two spray tubes 42 arranged on both sides of proof 16. By the water discharged from spray tubes 42, the detached color particles are washed off proof 16 along with the developer liquid. Brush roller 38 and washing device 40 together form the take-off device 44 for removal of color particles from proof 16.

Arranged behind the spray tubes 42 are the transport rollers 26 which, in addition to their transport function, also act as squeezing rollers for wiping proof 16 clean of excess water and excess developer liquid along with the detached color particles. Transport rollers 26 are made from a relatively compressible material (rubber sponge and the like) so as to be able to displace water, developer liquid and color particles.

After moving through transport rollers 26, proof 16 travels through a drying air shaft or channel 46, passing through said channel 46 transversely to the longitudinal dimension thereof. Within channel 46, the portion of proof 16 located therein is subjected to a hot air flow on both sides of proof 16 so that the proof is dried. Behind the drying air channel 46, the take-off rollers 28 of the transport means are arranged for completely discharging the proof 16 from developer apparatus 14.

All of the above mentioned components and units extend through developer apparatus 14 transversely to the transport direction of proof 16.

FIG. 1 further shows a tempering device 48 for heating and/or cooling the developer liquid supplied to spray tube 32. Tempering device 48 is attached to the supply conduit 50 through which the developer liquid is conveyed from a reservoir (not shown) to spray tube 32. Supply conduit 50 further includes a conveyer pump 51 (cf. the schematic representation of the control circuit in FIG. 8).

Tempering device 48 comprises three Peltier elements 52 which, when viewed in the flow direction of the developer liquid, are connected in series. Depending on the operating condition, the Peltier elements 52 either transmit heat to the developer liquid or withdraw heat therefrom for cooling purposes. According to FIG. 8, the Peltier elements 52 are electrically connected to a voltage generating device 54 of which the output D.C. voltage can be adjusted in voltage and polarity. The temperature control will still be explained in greater detail. In that part of conduit 50 which leads from tempering device 48 to spray tube 32, a temperature sensor 56 is arranged for measuring the temperature of the developer liquid to be supplied to spray tube 32. Temperature sensor 56 is electrically connected to a control unit 58 which compares the actual temperature delivered by temperature sensor 56 and the desired temperature, and which, according to the result of this comparison, emits control signals to voltage generating device 54 to control the amount and polarity of the supply voltage for the Peltier elements 52.

The advantage of the described connection of Peltier elements for tempering the developer liquid consists in that one and the same element can be used both for heating and cooling, i.e., for tempering or, respectively, for controlling the temperature of the developer liquid. By simply switching the polarity of the supply voltage for the Peltier elements 52, it becomes possible to switch their operating modes as cooling or heating elements. Further, by variation of the amount of the supply voltages for the Peltier elements, the temperature of the developer liquid can be controlled quite accurately within relatively narrow limits of ±0.5° C. Thus, use of the tempering device 48 meets the demands for generating proofs of high quality, i.e., obtaining a temperature of the developer liquid in the range between, e.g., about 23° and 26° C., for example, and keeping that temperature constant over a long period of time.

Figure 5:
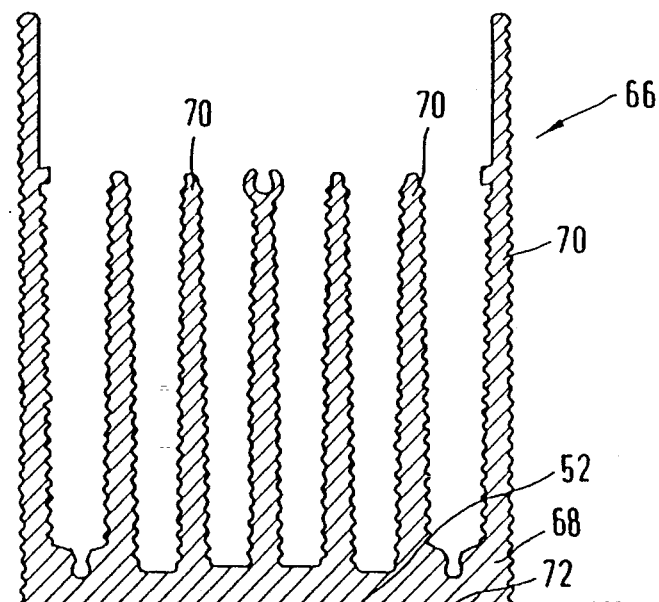
FIG. 5 is a sectional view along the plane V—V of FIG. 4.
Figure 6:
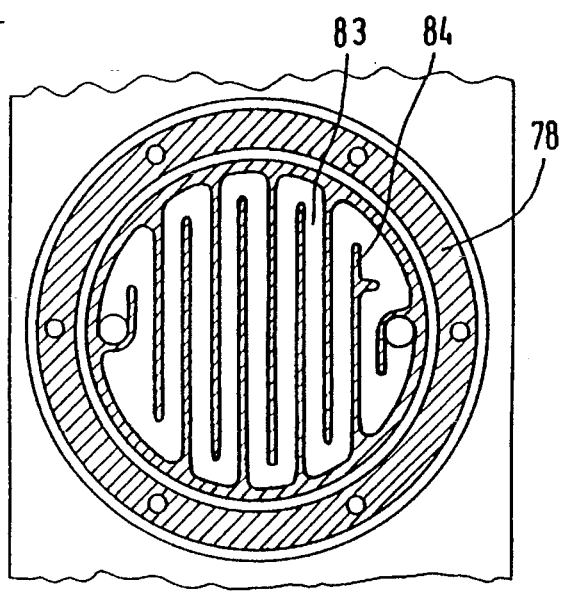
FIG. 6 is a sectional view along the plane VI—VI of FIG. 5.
Figure 7:
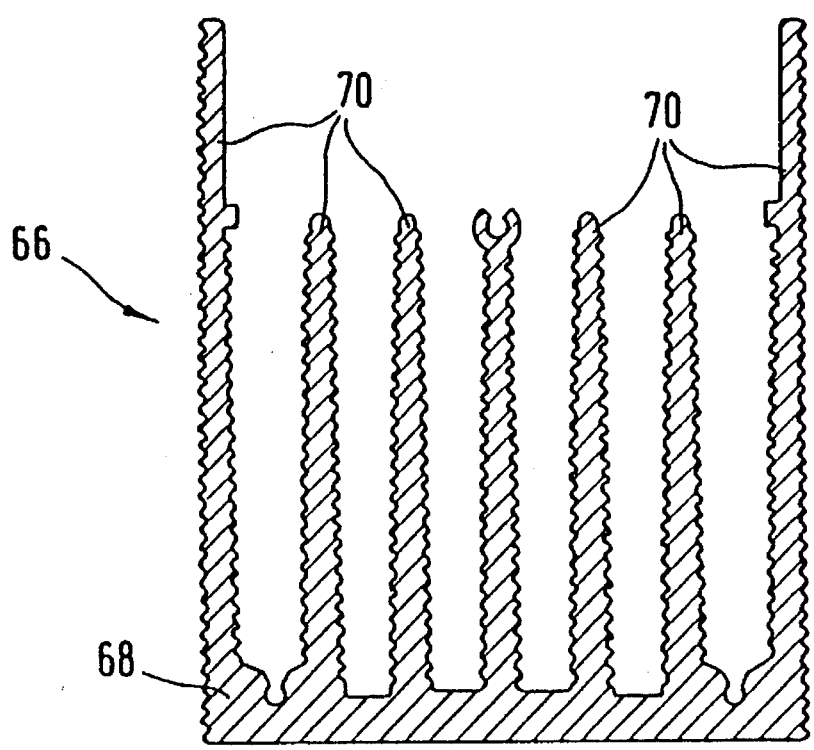
FIG. 7 is an exploded view of the arrangement shown in FIG. 5.
Figure 7:
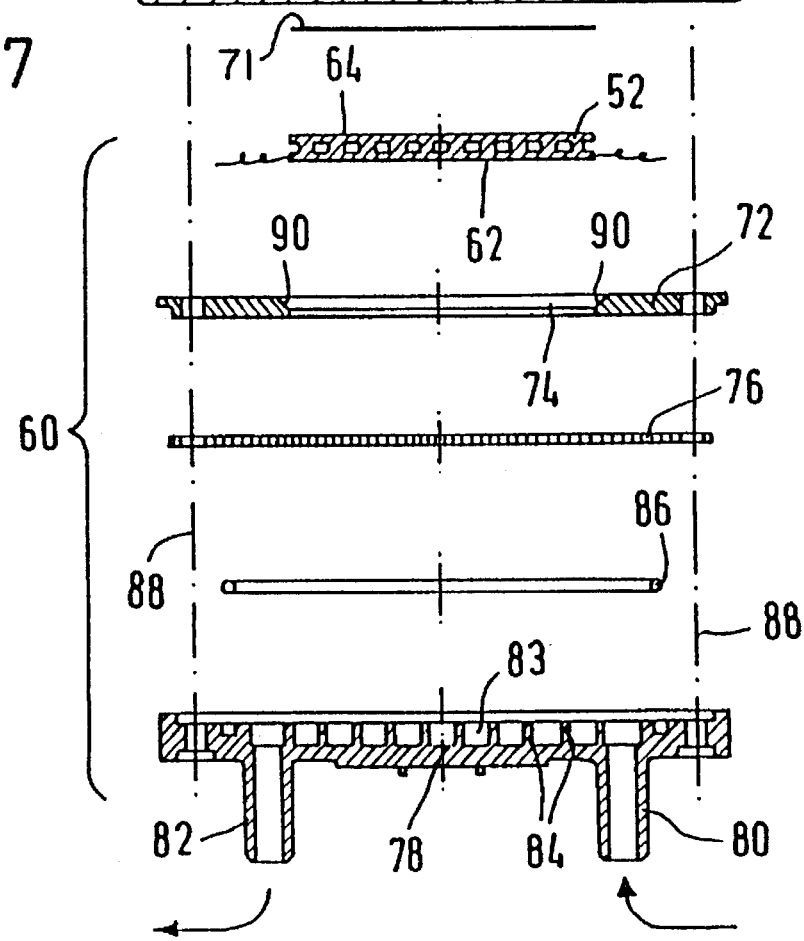

Each Peltier element 52 is coupled, through a special heat exchanger 60, to the conduit 50 conveying the developer liquid. The details of such a heat exchanger unit 60 are illustrated in FIGS. 5–7 and will be explained hereunder. The Peltier element 52 is provided as a plate-shaped element, with its two large-surfaced sides forming the tempering faces 62, 64.

Depending on the respective polarity of the applied supply voltage, one of the tempering faces will cool down while the other one will heat up, and vice versa. For improved dissipation of the heat or cold from that tempering face which is not thermally contacted with the developer liquid (in the instant embodiment, this is the tempering face 64 of FIG. 7), the Peltier element 52 has this tempering face 64 abutting on a heat/cold dissipation device 66. Dissipation device 66 is provided with a heat/cold dissipation body 68 which, for enlarging its surface area, comprises a plurality of (cooling) ribs. For enhanced thermal contacting, a heat-conductive paste 71 is applied between the tempering face 64 facing towards the heat/cold dissipation body 68 and the heat/cold dissipation body 68. This paste-like heat-transmitting medium consists of a heat-resistant grease (e.g. silicone) to which has been added a powder of heat-conductive metals (e.g. Bu, Cu). Heat-conductive paste of this type is generally available in specialized trade in the field of electronics.

Peltier element 52 has its smaller sides (not shown) enclosed by a plastic intermediate member 72 having an opening 74 corresponding to the geometrical shape of Peltier element 52. The thickness of intermediate member 72 is identical with the thickness of Peltier element 52. On the side of intermediate member 72 facing away from the heat/cold dissipation body 68, there is arranged a heat/cold transmission member 76 provided as a metallic plate being in heat-conductive contact with tempering a face 62 of Peltier element 52 and being in thermal contact therewith by a layer of a heat-conductive paste (not shown). The heat/cold transmission member 76 is that element which is contacted by the developer liquid to be tempered, in that the developer liquid is guided along the surface of heat/cold transmission member 76. The heat/cold transmission member 76 is in abutment with a conduit guide member 78 made from plastic, which on its outer side averted from the heat/cold transmission member 76 is provided with an inlet connector 80 and an outlet connector 82. The inner side of conduit guide member 78 is provided with an open-topped, zigzag-shaped channel system which connects the connectors 80, 82 to each other and which is formed by individual, mutually spaced and mutually parallel ribs 84. For sealing the channel system having the developer liquid flowing therethrough, an O-ring 86 is provided which is arranged in a circumferential groove on the inner side of conduit guide member 78 and is in sealing abutment with the heat/cold transmission member 76.

The conduit guide member 78, the heat/cold transmission member 76, the intermediate member 72 and the heat/cold dissipation body 68 are screw-connected to each other as shown at 88 in FIGS. 5 and 7. For reduction of possible heat flow from the Peltier element 52 into the intermediate member 72, the opening 74 of intermediate member 72 is formed with a beveled portion 90 along the surrounding edge of the opening. The minimum cross-section of opening 74 is dimensioned such that the intermediate member 72 surrounds the Peltier element 52 at a close distance only. This measure is suitable to prevent a heat connection between the two tempering faces 62, 64 due to laterally protruding heat conductive paste. This is accomplished because the intermediate member 72 (due to its opening 74 dimensioned in the above manner) acts like a barrier between the two layers of heat conductive paste. For precluding loss of thermal energy via intermediate member 72 in this arrangement, the above beveled portion 90 along the edge of opening 74 is provided. An annular space is formed in the region of beveled portion 90 between intermediate member 72 and Peltier element 52, preventing direct contact between intermediate member 72 and Peltier element 52.

Figure 3:
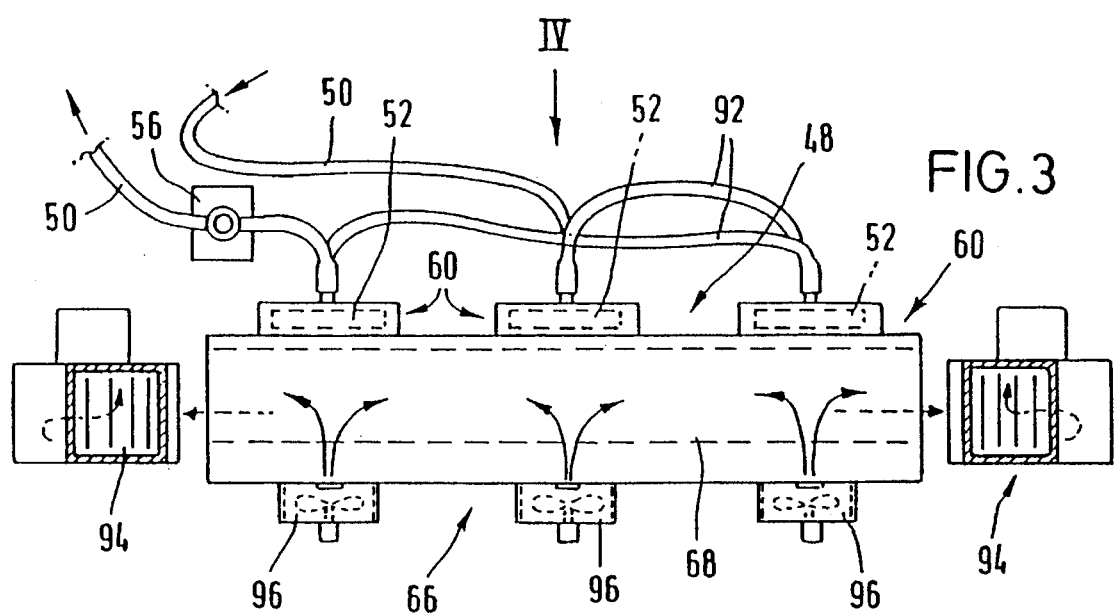
FIG. 3 is a side view of the tempering device with a heat/cold dissipation device according to the plane III—III of FIG. 2.
Figure 4:
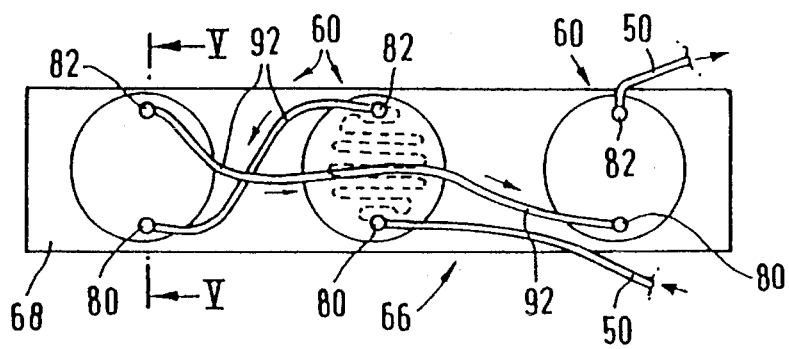
FIG. 4 is a view of the tempering device and the heat/cold dissipation device in the direction of arrow IV of FIG. 3.

As shown in FIGS. 3 and 4, all three heat exchanger units 60 are connected to the heat/cold dissipation body 68, while those tempering faces 64 which are not thermally contacted with the developer liquid are in thermally contacting abutment on heat/cold dissipation body 68. The three heat exchangers 60 are equally distributed over the length of heat/cold dissipation body 68, with the first heat exchanger 60 in the flow direction of the developer liquid being arranged in the center of heat/cold dissipation body 68. The two other heat exchangers 60 are arranged to both sides of the first heat exchanger 60. In FIG. 4, the liquid connection among the heat exchanger units 60 is illustrated by arrows drawn along the hoses 92 interconnecting the connectors 80, 82 of the conduit guide members 78 and the heat exchanger units 60.

Figure 2:
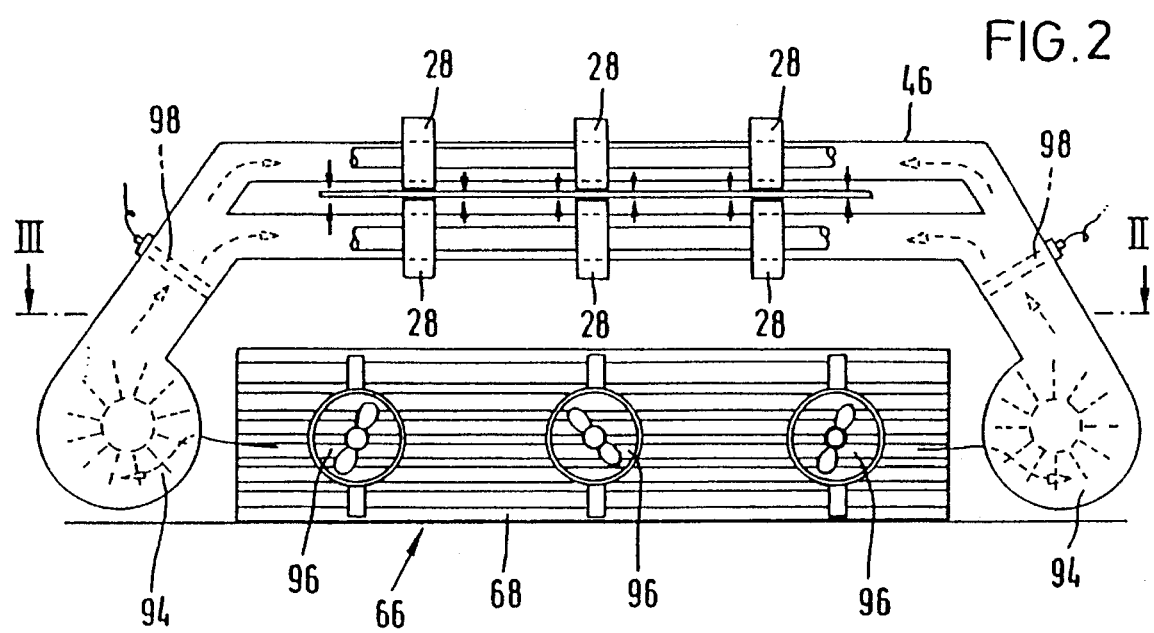
FIG. 2 is a rear view of the developer apparatus in the direction of arrow II of FIG. 1.

As evident from FIGS. 2 and 3, tangential blowers 94 are arranged in the immediate vicinity of the two axial ends of heat/cold dissipation body 68. Further, three blowers 96 are provided on the outer side of the heat/cold dissipation body 68 averted from the heat exchanger units 60. Said blowers 96 are arranged opposite the heat exchanger units 60 and generate air flows directed at right angles against heat/cold dissipation body 68 (see FIG. 3). The blowers 96 improve the dissipation of thermal energy (heat or cold) via the heat/cold dissipation body 68. The air flow generated by the blowers 96 is guided to the air-intake side of the tangential blowers 94, which is performed, among other reasons, because of the construction of the heat/cold dissipation body 68 with its ribs 70 extending between the two tangential blowers 94. The tangential blowers 94 are connected to the ends of drying air channel 46 through which, as described above, the developed proof is horizontally passed before leaving the developer apparatus 14. Downstream of the tangential blowers 94, electric heater units 98 (FIG. 2) are arranged for heating the air flow provided for drying. If the Peltier elements 52 operate as cooling elements for cooling the developer liquid, the tempering faces 62 of the Peltier elements 52 connected to heat/cold dissipation body 68 will give off heat which—by the air flows generated by blowers 96 is transmitted to the tangential blowers 94, which in this operating mode of the Peltier elements 52 improves the overall energy balance of the developer apparatus.

Figure 8:
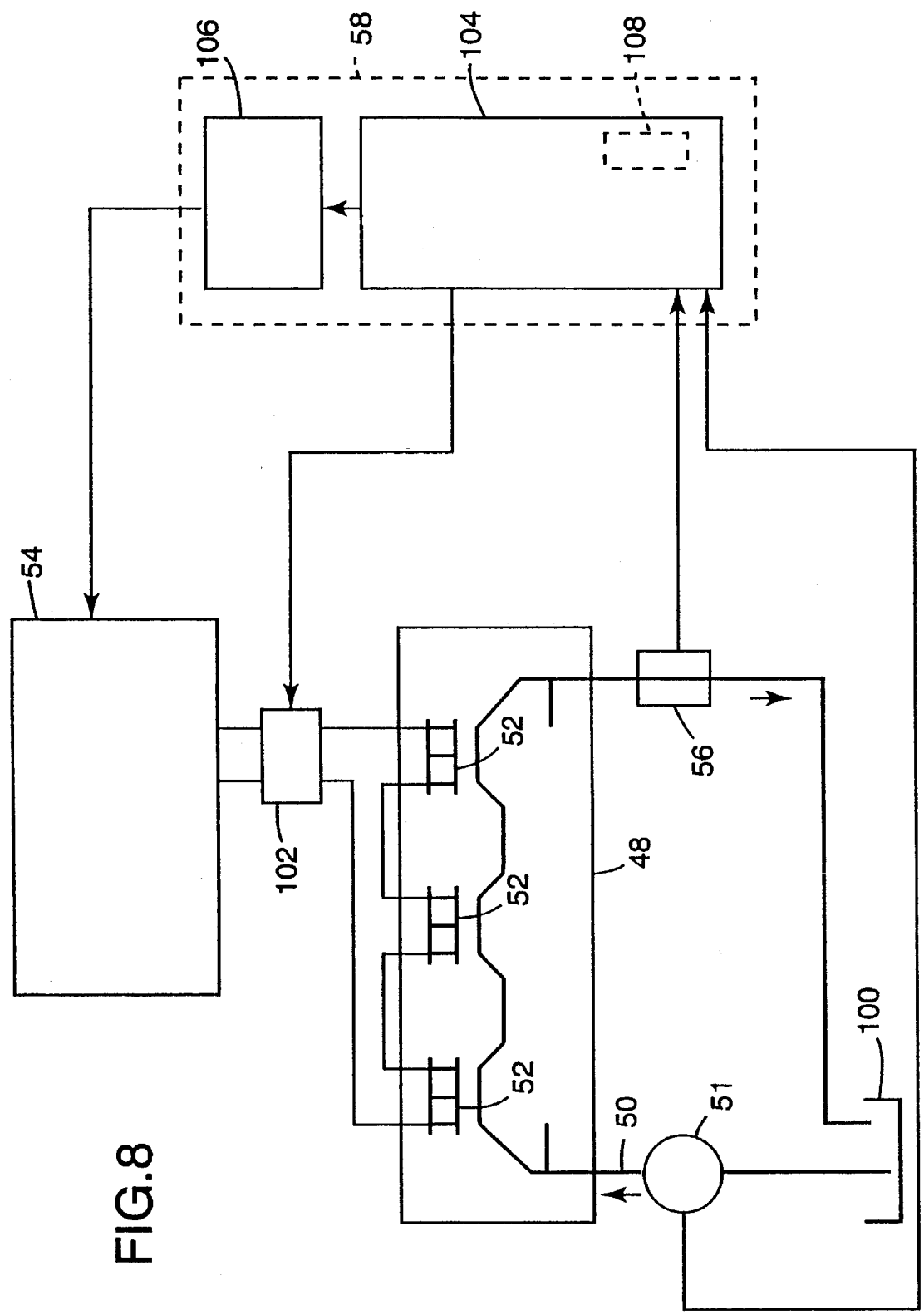
FIG. 8 is a block diagram of the electrical circuitry of the tempering device.

With reference to FIGS. 8 and 9, the method for controlling the temperature of the developer liquid will be explained in greater detail.

In FIG. 8, reference numeral 48 designates a tempering device for tempering, in continuous operation and by means of three Peltier elements 52, the developer liquid passed through conduit 50. Arranged within conduit 50 is a conveyer pump 51 for conveying the developer liquid from a reservoir 100 and transporting the liquid via conduit 50 to the developer liquid dispenser unit 30, 32 (not shown in FIG. 8). Temperature sensor 56 is arranged in conduit 50 downstream of tempering device 48. The Peltier elements 52 are electrically connected in series and are connected to voltage generating device 54. Between voltage generating device 54 and Peltier elements 52, there is connected a polarity switching device 102 provided as a relay. Polarity switching device 102 serves for reversing the polarity of the supply voltage of the Peltier elements 52, for thus using the Peltier elements 52 for heating or for cooling the developer liquid, as required.

Pump 51 and temperature sensor 56 are each electrically connected to control unit 58. Control unit 58 receives signals from these two components 51 and 56. Control unit 58 in turn emits control signals to polarity switching device 102 and voltage generating device 54. The control signal supplied to voltage generating device 54 determines the amount of the supply voltage to be supplied to the Peltier elements 52 while the control signal supplied to polarity switching device 102 sets the polarity of this supply voltage. Next, the temperature control method performed in control unit 58 will be explained with reference to FIG. 9. Control unit 58 comprises a microprocessor 104 and a signal converter 106 for converting the output signal of microprocessor 104 into a control signal for voltage generating device 54. Microprocessor 104 includes, among other components, a memory 108 for storing the control parameter which is to be updated and used for later flow intervals.

Microprocessor 104 performs the functions corresponding to those of a PI control device. After switch-on of the developer apparatus, the contents of memory 108 are reset so that memory 108 contains the initial value for the I-portion (e.g., zero). This is shown at step 110 in FIG. 9. In the next processing step 112, microprocessor 104 receives, via its connecting line to temperature sensor 56, the measured value of the actual temperature of the developer liquid. On the basis of the difference between the actual temperature and the desired temperature (the latter is either fixedly stored in microprocessor 104 or is supplied thereto by a suitable setting means, which is not illustrated), microprocessor 104 then calculates the current P-portion in step 114 as a function of the above difference. In step 116, it is detected whether or not conveyer pump 51 is switched on. This is performed by means of that signal which is received by microprocessor 104 via its connecting line to pump 51. The above detecting step 116 enables the microprocessor 104 to differentiate between the conditions "developer liquid flowing" and "developer liquid standing." If pump 51 is in the switched-on state, the control process is continued by step 118 in which the actual I-portion is calculated. This is performed on basis of the function of the difference between the actual temperature and the desired temperature (cf. the above calculation provided for step 114), multiplied by a time factor, with the result being added to the contents of memory 108. In step 120, the thus calculated I-portion is stored in memory 108. From the P-portion and the I-portion, there is obtained the output signal of microprocessor 104 which is transmitted to converter 106 which in turn transmits the signal converted by it to voltage generating device 54. This process is performed in step 122.

Steps 112 to 122 are carried out a number of times corresponding to the cycle time of microprocessor 104.

If the developer apparatus switches from the condition "developer liquid flowing" to the condition "developer liquid standing," the process is continued, after step 116, with step 124 in which the value of the I-portion is set to the initial value or respectively to zero, without the I-portion being stored. After step 124 has been carried out, the process is continued with step 122 in which—inter alia—the output signal of microprocessor 104 is generated from the current I-portion (as a result of step 122, this is the initial value or zero) and the current P-portion. Then, the control processor starts again with step 122. If the pump is switched on again at a later time, i.e., if there is again a flow time interval, the calculation of the I-portion in step 118 is performed using the value in memory 108, which value has been stored therein at the end of the previous flow time interval. on the basis of this stored value of the I-portion, which possibly is not the optimum value but in any case is more appropriate than the I-portion existing at the end of the previous standstill interval, the actual value for the I-portion is obtained then. This is performed by forming the product of the P-portion obtained in step 114 and a time factor, which product is added to the stored value for the I-portion.

In a developer apparatus for a color proofing system, the demands posed on the control method according to FIGS. 8 and 9 are the following. During the developing process, a developer liquid quantity of about 140 ml has to be fed to the developer liquid dispenser unit 30 for about one minute. In doing so, it is to be assumed that the developer liquid has an initial temperature in the range of 15° C. to 35° C. (according to seasonal and room conditions). It is required that the developer liquid be applied onto the proof at a temperature of about 25° C. These are the conditions during the flow intervals. Different therefrom, the conditions during the standstill interval are such that temperature control has to be performed on a uniform quantity of about 15 ml. Said quantity is that quantity of developer liquid which is contained in the portion of conduit 50 extending through tempering device 48. Other than in the flow interval, this quantity of developer liquid is not subjected to any changes of the initial temperature because there is no flow, i.e., because the tempering device 48 is not supplied with developer liquid having a temperature different from the controlled temperature.

I claim:

1. A method for controlling the temperature of an intermittently standing and flowing fluid which is at rest during standstill intervals and is flowing during flow intervals, wherein a desired temperature for the fluid is predetermined, a temperature of the fluid is measured, the temperature of the fluid is changed by a tempering device, said changed temperature being raised if the temperature measured is lower than said desired temperature and being lowered if said temperature measured is higher than said desired temperature, said tempering device is controlled by a control unit with at least one variable and self-adjusting control parameter, the fluid is determined to be in a motion selected from the group consisting of flow and stationary, and a value of said self-adjusting control parameter of said control unit variable when a flow interval ends is stored and at a beginning of a next flow interval said stored control unit variable is set as a current control parameter in said control unit.

2. The method according to claim 1, characterized in that a respective current value of said self-adjusting control parameter is updated at predetermined intervals and is stored in a memory, and that this updating of the contents of the memory is interrupted for a duration of a standstill interval.

3. The method according to claim 1, characterized in that the control unit is deactivated in the standstill intervals.

4. The method according to claim 1, characterized in that the control unit is active also in the standstill intervals.

5. The method according to claim 1, characterized in that the control unit performs at least one integral control and that said at least one control parameter is the I-portion of the integral control.

6. The method according to claim 1, characterized in that at least one control parameter adjusts in dependence on the current difference between the actual temperature and the desired temperature.

7. The method according to claim 1, characterized in that the control unit performs at least one proportional control and that the control parameter representing the P-portion of the proportional control is particularly variable and self-adjusting.

8. The method according to claims 1, characterized in that the fluid is heated by at least one electric heater element operated by an electric supply voltage and/or is cooled by at least one Peltier element operated by an electric supply voltage, and that amounts of the electric supply voltages of both elements are set under control of the control unit.

9. The method according to claim 8, characterized in that a Peltier element is used as a heating element.

10. The method according to claim 1, characterized in that the fluid is heated and/or cooled by a tempering device by at least one Peltier element operated by an electric supply voltage with reversible polarity, and that the amount and the polarity of the electric supply voltage are set under control of the control unit.

11. The method according to claim 1, characterized in that
the flow velocity of the fluid is selected differently within different flow intervals, the flow velocity of the fluid at which the fluid flows during a flow interval, is measured, or that an amount corresponding to this flow velocity is detected, at the end of a flow interval, the value of the control parameter is stored as assigned to the flow velocity measured for this flow interval, and at the beginning of the next flow interval, the stored value of the control parameter assigned to the current flow velocity is set in the control unit as the current control parameter.

* * * * *

UNITED STATES PATENT AND TRADEMARK OFFICE
CERTIFICATE OF CORRECTION

PATENT NO. : 5,605,189
DATED : February 25, 1997
INVENTOR(S) : Schlickhoff

It is certified that error appears in the above-indentified patent and that said Letters Patent is hereby corrected as shown below:

Col. 15, line 3, "is the I-portion" should be --is an I-portion--.

Col. 15, line 6, "on the" should be --on a--.

Col. 15, lines 11/12, "the P-portion of the proportional" should be --a P-portion of a proportional--.

Col. 15, line 15, "is heated" should be --has its temperature changed by a process selected from the group consisting of heating--.

Col. 15, line 16, "and/or is cooled" should be --and cooling--.

Col. 15, line 18, "of the electric supply" should be --of electric supply--.

Col. 16, line 2, "is heated and/or cooled" should be --temperature is changed by a process selected from the group consisting of heating and cooling--.

Col. 16, line 4, "that the amount and the" should be --that amount and--.

UNITED STATES PATENT AND TRADEMARK OFFICE
CERTIFICATE OF CORRECTION

PATENT NO. : 5,605,189

DATED : February 25, 1997

INVENTOR(S) : Schlickhoff

It is certified that error appears in the above-indentified patent and that said Letters Patent is hereby corrected as shown below:

Col. 16, line 10, insert --at least one feature selected from the group consisting of --.

Col. 16, line 11, "interval, is measured, or that an" should be --interval and an--.

Col. 16, line 12, "detected" should be --determined--.

Signed and Sealed this

Twenty-third Day of September, 1997

Attest:

BRUCE LEHMAN

Attesting Officer

Commissioner of Patents and Trademarks